United States Patent [19]

Sugiyama et al.

[11] Patent Number: 5,737,665
[45] Date of Patent: Apr. 7, 1998

[54] APPARATUS FOR CALIBRATING TONER DENSITY FOR COLOR IMAGES

[75] Inventors: Mitsugu Sugiyama, Yokohama; Eiichi Sasaki, Sagamihara; Tadashi Shinohara, Tokyo; Kouichi Irie, Kashiwa; Yutaka Shio, Yokohama, all of Japan

[73] Assignee: Ricoh Company, Ltd., Tokyo, Japan

[21] Appl. No.: 568,950

[22] Filed: Dec. 7, 1995

[30] Foreign Application Priority Data

Dec. 7, 1994 [JP] Japan ................ 6-303266

[51] Int. Cl.$^6$ ................ G03G 15/00; G03G 15/01; G03G 15/02; G03G 15/06
[52] U.S. Cl. ................ 399/39; 399/44; 399/49; 399/50; 399/55
[58] Field of Search ................ 399/39, 40, 44, 399/49, 50, 55; 358/296, 298

[56] References Cited

U.S. PATENT DOCUMENTS

| | | | |
|---|---|---|---|
| 4,894,685 | 1/1990 | Shoji | 399/39 |
| 5,189,521 | 2/1993 | Ohtsubo et al. | 358/296 |
| 5,565,995 | 10/1996 | Yamada et al. | 358/298 |
| 5,572,330 | 11/1996 | Sasanuma | 358/298 |

FOREIGN PATENT DOCUMENTS

| | | |
|---|---|---|
| 60-260067 | 12/1985 | Japan . |
| 4-36776 | 2/1992 | Japan . |
| 4-199071 | 7/1992 | Japan . |
| 4-267270 | 9/1992 | Japan . |
| 4-343371 | 11/1992 | Japan . |
| 5-2305 | 1/1993 | Japan . |
| 5-161013 | 6/1993 | Japan . |

*Primary Examiner*—William J. Royer
*Attorney, Agent, or Firm*—Oblon, Spivak, McClelland, Maier & Neustadt, P.C.

[57] ABSTRACT

In a color image forming apparatus, a test pattern is formed by a color toner and provided with multiple tones by a dither method. The toner density of the test pattern is accurately read by a simple structure and faithfully corresponds to the actual toner density.

28 Claims, 4 Drawing Sheets

APPARATUS FOR CALIBRATING TONER DENSITY FOR COLOR IMAGES

BACKGROUND OF THE INVENTION

The present invention relates to a color copier, color printer, color facsimile apparatus or similar color image forming apparatus.

A color printer, for example, transfers color toners to a printing medium or sheet by using an electrophotographic process and thereby forms a color image. Specifically, the printer charges the surface of a photoconductive element with a charger, electrostatically forms a latent image on the charged surface of the photoconductive element with an exposing unit, develops the latent image with a color toner, transfers the color toner to a sheet with an image transfer unit, and then fixes the toner on the sheet with a fixing unit.

The problem with the conventional color printer is that the density and tonality of a particular color toner are degraded due to, e.g., the aging of the photoconductive element or image carrier and the varying temperature and humidity around the printer. This, coupled with the fact that the color balance of the resulting color image is also degraded, lowers the print quality to a critical degree. In order to eliminate this problem, it has been customary with, e.g., a digital color copier, to form multitone test patterns by toners of different colors, optically read the individual test pattern by a photosensor, determine the toner density of the individual test pattern, and then adjust a voltage to be applied to a charger and/or a voltage to be applied to a developing unit so as to correct the toner density.

Assume that the multitone test pattern whose toner density ranges from 0% to 100% in area ratio is printed on a sheet by a color toner and implemented as a dot image, and then read by a photosensor. Then, the output of the photosensor is lowest at the toner density of about 50% while increasing in ranges higher than and lower than about 50%. This stems from the fact that the color toner reflects incident light in a particular spectrum. Specifically, in the portion of the test pattern where the density is low, the reflection from the toner decreases because the area of the background decreases with an increase in toner density. In the medium density portion, the decrease in reflection attributable to the decrease in background area and the increase in reflection attributable to the increase in toner area are balanced. Further, in the high density portion, the reflection increases due to an increase in toner area. Hence, even when such a multitone test pattern is formed by the color toner and then read by the photosensor, the actual toner density of the pattern cannot be determined with accuracy.

In light of the above, there has been proposed an image forming apparatus capable of determining the toner density of a color toner by use of a photosensor responsive to a test pattern, and a potential sensor responsive to the surface potential of a photoconductive element. This kind of scheme, however, needs two different sensors, and moreover results in a complicated structure due to the decision based on the outputs of the two sensors. The complicated structure obstructs the miniaturization of the apparatus and lowers productivity.

SUMMARY OF THE INVENTION

It is therefore an object of the present invention to provide an image forming apparatus capable of detecting the toner density of a multitone test pattern accurately with a simple structure.

A color image forming apparatus of the present invention has a photoconductive element, a charger for charging the surface of the photoconductive element, an exposing unit for electrostatically forming a latent image on the charged surface of the photoconductive element, and a developing unit for developing the latent image with a color toner. A pattern forming section causes the exposing unit to electrostatically form on the photoconductive element a latent image representative of a test pattern which has multiple tones set by a dimer method. A pattern reading section optically reads the test pattern developed by the color toner. A density detecting section detects the toner density of the test pattern in response to the output of the pattern reading section.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
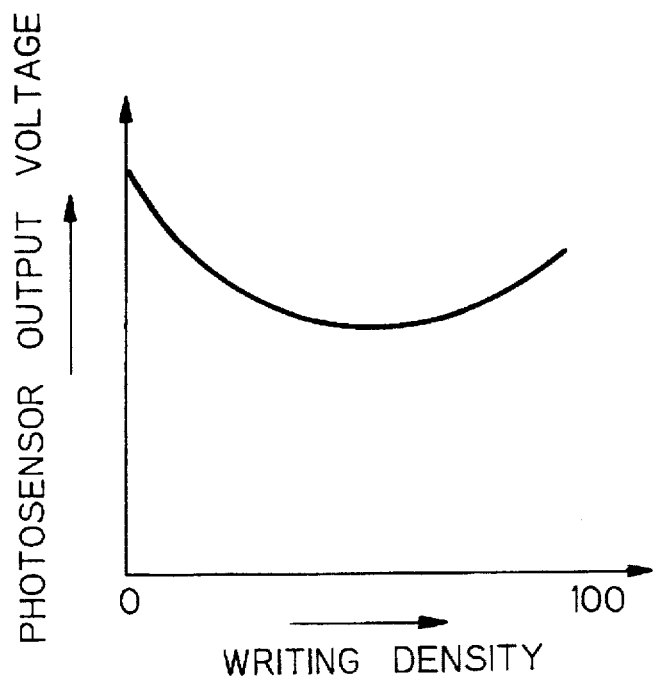
FIG. 1 is a graph showing a relation between the toner density and the output voltage of a photosensor particular to a conventional color image forming apparatus.
Figure 2:
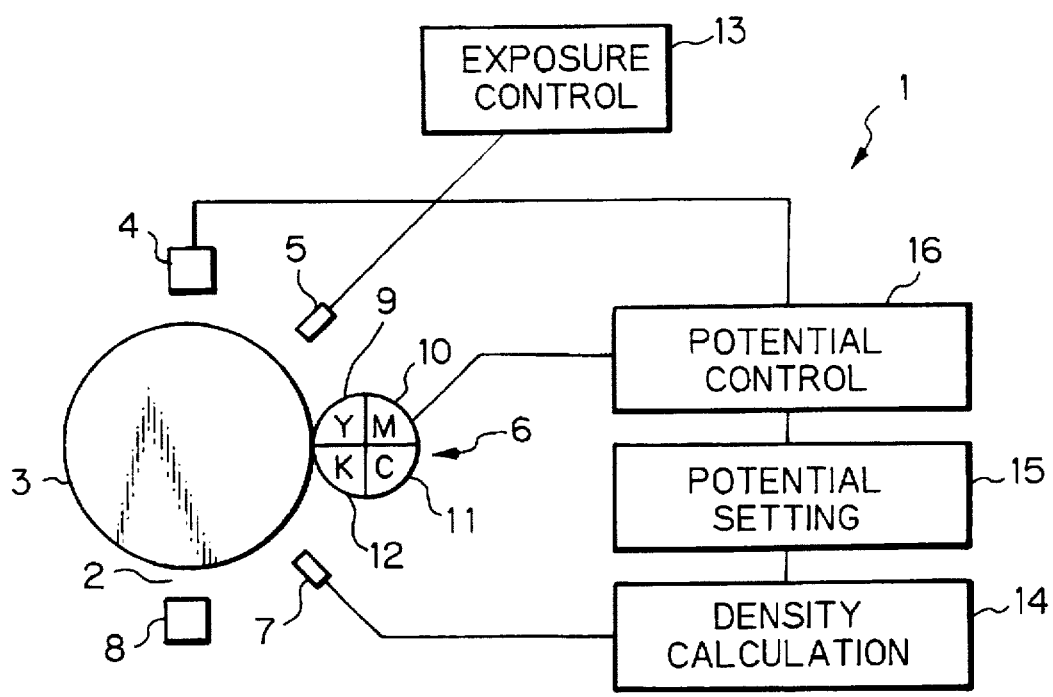
FIG. 2 schematically shows a color image forming apparatus embodying the present invention and implemented as a color printer.

To better understand the present invention, a brief reference will be made to a conventional image forming apparatus. A conventional digital color copier, for example, is constructed to form a multitone test pattern with each of toners of different colors. A photosensor optically reads the test pattern. The density of the individual color toner is determined on the basis of the output of the photosensor. A voltage to be applied to a charger and/or a voltage to be applied to a developing unit is adjusted in accordance with the determined toner density so as to correct the toner density. However, as shown in FIG. 1, when the multitone test pattern whose toner density ranges from 0% to 100% in area ratio is printed on a sheet by a color toner and implemented as a dot image, and then read by a photosensor, the output of the photosensor is lowest at the toner density of about 50% while increasing in ranges higher than and lower than about 50%. This stems from the fact stated earlier. It follows that even when such a multitone test pattern is formed by the color toner and then read by the photosensor, the actual toner density of the pattern cannot be determined with accuracy.

Referring to FIGS. 2–7, a color image forming apparatus embodying the present invention is shown and implemented as a color printer 1 by way of example. As shown, the color printer 1 has a sheet transport path 2 extending from a sheet cassette, not shown, to a tray for receiving printings, not shown. A photoconductive drum, or image carrier, 3 is located on the transport path 2. Sequentially arranged around the drum 3 are a toner cleaner, not shown, a discharger, not shown, a charger 4, a laser scanner 5, a developing unit 6 in the form of a revolver, a reflection type photosensor, or pattern reading means, 7, and an image transfer unit 8.

The developing unit 6 is rotatably mounted on a shaft and provided with four developing sections or chambers 9-12 therein. The developing chambers 9-12 respectively store a yellow (Y) toner, magenta (M) toner, cyan (C) toner, and black (K) toner therein. The laser scanner 5 is connected to an exposure control, or pattern forming means, 13 which is implemented by a microcomputer. The exposure control 13 causes the laser scanner 5 to electrostatically form on the drum 3 a latent image representative of a multitone test pattern produced by a dither method.

Figure 4:
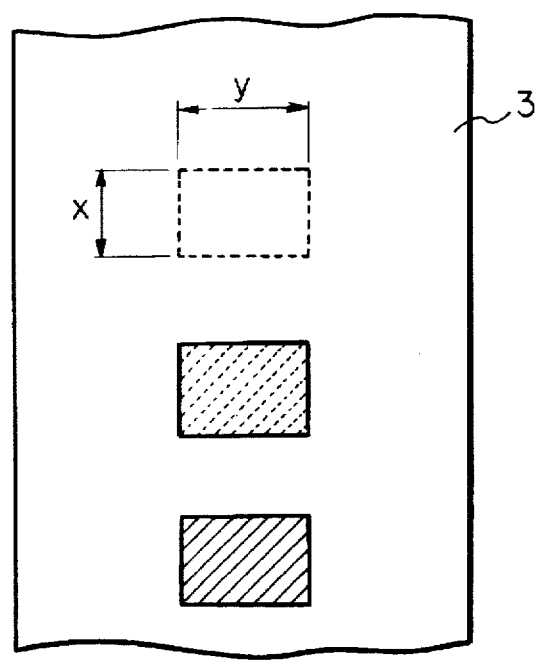
FIG. 4 is a plan view of a specific test pattern.
Figure 5A:
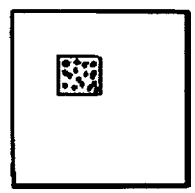
FIGS. 5A and 5B show specific pixels particular to a dither method.
Figure 5B:
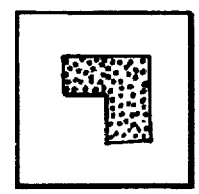

Specifically, as shown in FIG. 4, the test pattern is made up of a plurality of rectangular images each consisting of "x×y" pixels. The densities of the rectangular images are sequentially changed in order to provide the pattern with multiple tones as a whole. The dither method, like a conventional dot pattern method, belongs to a family of schemes available for rendering tonality. However, the difference is that, as shown in FIGS. 5A and 5B, the dither method changes the number of pixels without changing the size of each pixel, while the dot pattern method changes the size of each pixel without changing the number or the arrangement of pixels.

The latent image formed on the drum 3 is developed by any one of the color toners stored in the developing chambers 9-12 of the developing unit 6. The developed image or test pattern is optically read by the photosensor 7. A density calculation, or density detecting means, 14 is connected to the photosensor 7 and determines the toner density of the test pattern on the basis of the output of the photosensor 7.

A potential setting, or voltage setting means, 15 and a potential control 16 are sequentially connected to the density calculation 14 in this order. The potential control 16 is connected to the charger 4 and developing unit 6. The potential setting 15 sets, on the basis of the toner density detected by the density calculation 14, at least one of a bias to be applied to the charger 4 and a bias to be applied to the developing chamber storing the above toner under the control of the potential control 16.

The voltage setting of the potential control 16, the drum charging of the charger 4, the exposure of the exposure control 13, the development of the color toner, the reading of the photosensor 7, and the density detection of the density calculation 14 described above are repeated until the detected density α of the test pattern has been brought into a predetermined allowable range of αs±Δα where αs and Δα are a preselected reference value and a preselected allowable value, respectively. This is done by operation control means, not shown.

The potential control 16 sets the bias by, e.g., multiplying a difference between the detected density α and the reference value αs by a coefficient, and subtracting the resulting product from the current bias to thereby produce the next bias. Assume that the toner density of the test pattern fails to reach the allowable range even after the above procedure has been repeated a predetermined number of times. Then, reporting means, not shown, outputs information showing that a bias for development has not been set. This information appears on a display, not shown, in the form of a message.

Figure 3:
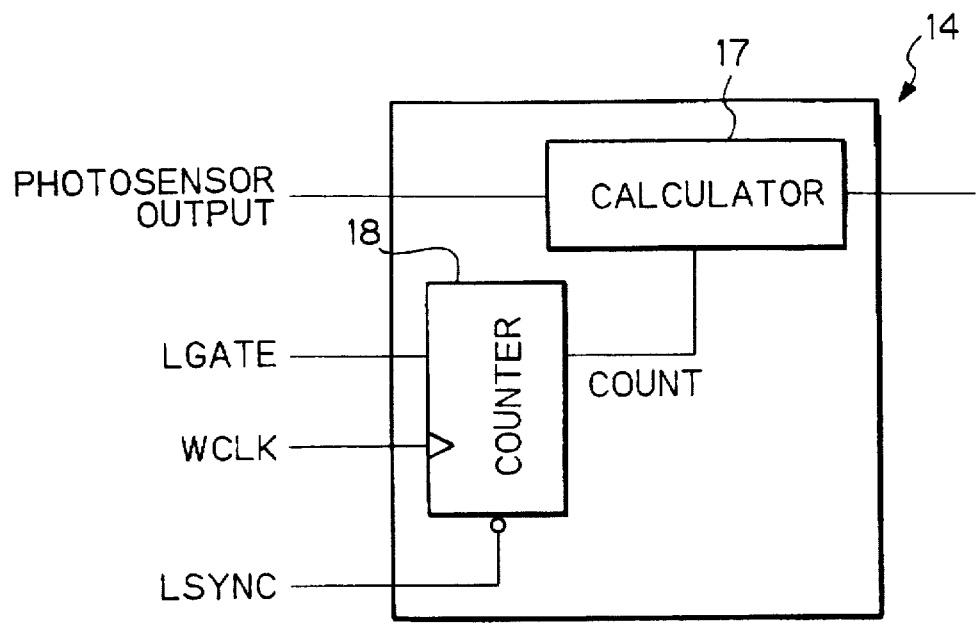
FIG. 3 is a block diagram schematically showing a specific arrangement of a density calculating section included in the embodiment.

As shown in FIG. 3, the density calculation 14 has a calculator 17 and a counter 18. The calculator 17 is connected to the photosensor 7 and potential setting 15 while the counter 18 is connected to the exposure control 13. The calculator 17 determines, in response to the output of the photosensor 7, the toner density of the test pattern developed by the color toner. The counter 18 counts a clock WCLK, i.e., the operation signal of the exposure control 13 in accordance with signals LGATE and LSYNC, while delivering the count to the calculator 17. When the count output from the counter 18 coincides with a preselected count, the calculator 17 takes in the output of the photosensor 7. Therefore, the density calculation 14 further includes signal detecting means for detecting the operation signal WCLK of the exposure control 13, and detection control means for controlling the read timing of the photosensor 7.

Figure 6:
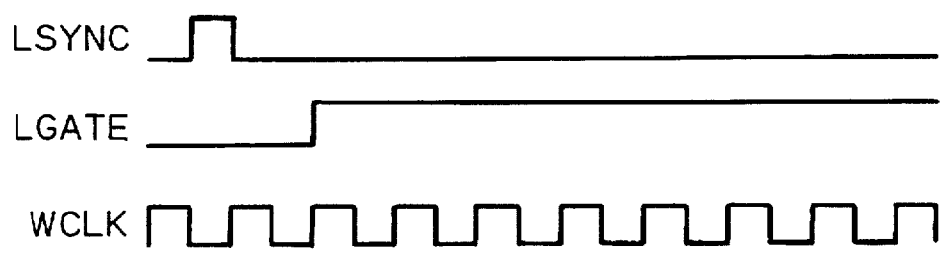
FIG. 6 is a timing chart representative of various signals applied to the density calculating section for timing control.

The signal LSYNC is a signal representative of the time when the laser scanner 5 starts main scanning, the signal LGATE is a signal representative of the beginning of a valid area in the main scanning direction, and the clock WCLK is a timing signal representative of pixel exposure. Hence, as shown in FIG. 6, the position of the test pattern can be determined if the clock WCLK is counted when the signal LGATE is in a high level; the signal LSYNC serves as a clear signal.

How the color printer 1 prints a color image will be described hereinafter. First, the developing unit 6 is rotated to a position where the developing chamber 9 storing the yellow toner faces the drum 3. In this condition, the surface of the drum 3 in rotation is charged by the charger 4 to which a bias is applied, and then exposed by the laser scanner 5. As a result, a latent image representative of a yellow image is electrostatically formed on the drum 3. The latent image is developed by the yellow toner of the developing chamber 9 to which a bias for development is applied. Thereafter, every time the drum 3 completes one rotation, the developing unit 6 is rotated 90 degrees. Consequently, a magenta toner image and a cyan toner image are sequentially formed on the drum 3 over the existing yellow toner image, completing a composite color image. The color image is transferred to a recording medium or sheet by a voltage applied to the image transfer unit 8. The sheet carrying the toner image is driven out of the printer 1 as a color printing by way of an image fixing unit, not shown.

The print quality available with the printer 1 is apt to fall because the color balance is susceptible to, e.g., the aging of the drum 3. In order to obviate this occurrence, the printer 1 detects, at the time of initialization following power-up by way of example, the density of each toner transferred to the drum 3 and then corrects it adequately, as follows.

First, the exposure control 13 drives the laser scanner 5 to form the latent image representative of the test pattern on the drum 3. The test pattern is provided with multiple tones by the dither method. The latent image is developed by one of the color toners stored in the developing unit 6, and the resulting toner image is optically read by the photosensor 7. The density calculation 14 determines the density of the test pattern in response to the output of the photosensor 7. At this instant, the operation signals WCLK, LGATE and LSYNC of the exposure control 13 are applied to the density calculation 14. In response, the counter 18, cleared by the signal LSYNC, counts the clock WCLK when the signal LGATE is in a high level. The calculator 17 compares the count from the counter 18 with the predetermined or reference count and takes in the output of the photosensor 7 on the coincidence of the two counts. Hence, the density calculation 14 can handle only the output data of the photosensor 7 representative of the test pattern. This prevents needless data from being input to the calculator 17 and thereby enhances the efficient detection of the toner density.

Figure 7:
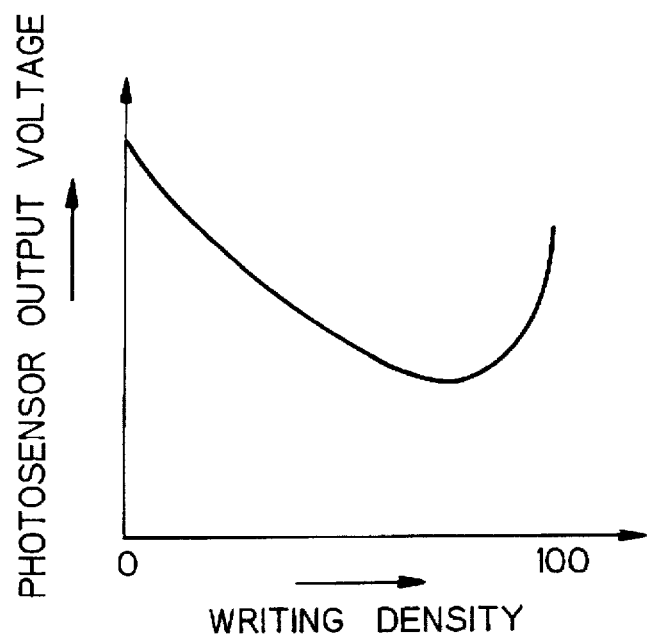
FIG. 7 shows a relation between the toner density of a test pattern and the output voltage of a photosensor particular to the illustrative embodiment.

As shown in FIG. 7, the actual toner density of the test pattern and the output voltage of the photosensor 7 correspond to each other substantially over the entire area because the test pattern is implemented by the dither method. Stated another way, the increase in toner density and the decrease in photosensor output correspond to each other over a broader range than when the test pattern is implemented by the dot pattern method. Hence, the density calculation 14 can detect the toner density of the test pattern with accuracy in response to the output of the photosensor 7. On receiving the detected toner density, the potential setting 15 sets a bias for the charger 4 and/or a bias for one of the developing chambers 9–12 storing the previously mentioned color toner. During the course of the following printing operation, the potential control 16 drives the charger 4 and developing chamber with the above biases.

The toner density detection and bias setting procedure described above is repeated with each of the other color toners. As a result, the printing density is corrected toner by toner. This allows the printer 1 to output a color image with desirable quality.

The printer 1 is capable of detecting the toner density accurately by using the dither method for the test pattern, as stated above. The dither method differs from the mesh method little when the toner density is 0% and when it is 100%; that is, even with the dither method, it is difficult to determine the toner density on the basis of the output of the photosensor when the toner density is 100% or close thereto. However, a printing with 100% toner density is free from a change in quality and is not concerned in color balance; the quality of a color image can be desirably corrected only if the toner density lying in the medium range of tonality is detected. Hence, the printer 1 can correct the quality of a color image adequately in a practical range.

The printer 1 may be so constructed as to automatically repeat, based on a particular operation mode, the above toner density detection until the actual density reaches the allowable range. In this case, when the density calculation 14 detects the toner density of the test pattern, whether or not it lies in the allowable range is determined. Then, the procedure beginning with the voltage setting by the potential control 16 and ending with the detection by the density calculation 14 is repeated until the actual density enters the allowable range. In this manner, the printer 1 can automatically correct the toner density of a color image without resorting to user's troublesome operation, thereby insuring high print quality with a simple procedure.

Assume that the toner density detected by the density calculation 14 does not reach the above allowable range even after the correction has been repeated a predetermined number of times. Then, a message representative of such a condition appears on the display and allows the user to take a necessary measure, e.g., requesting the replacement or repair of the drum 3 immediately.

Figure 8:
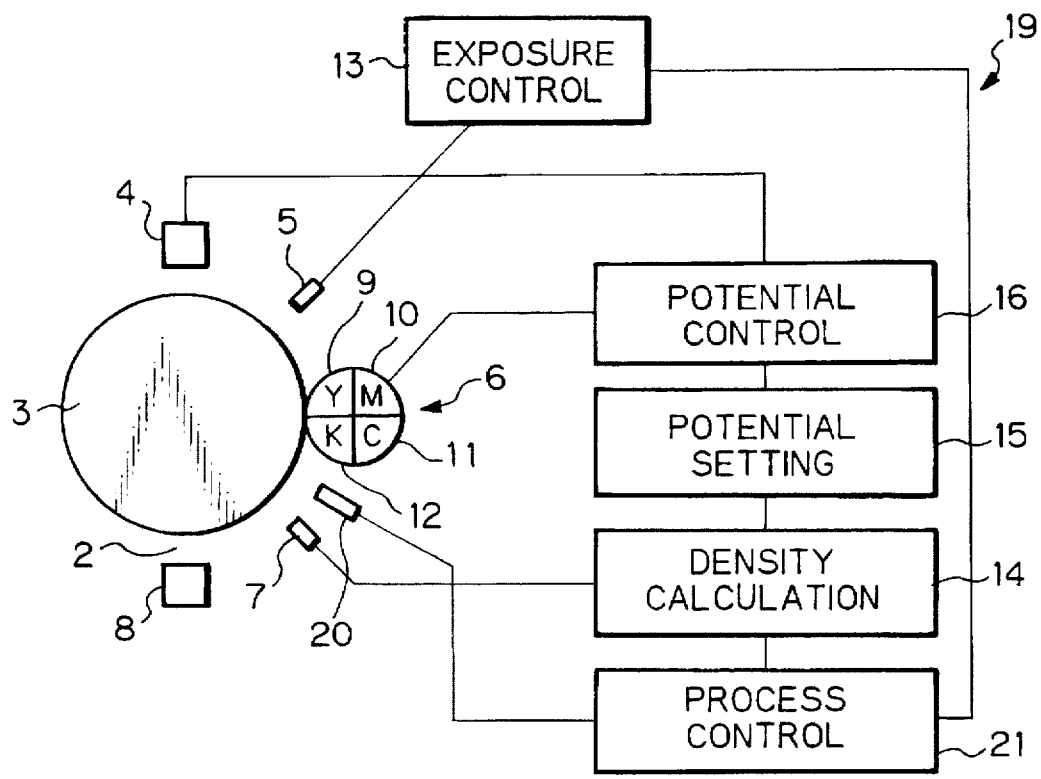
FIG. 8 schematically shows an alternative embodiment of the present invention.
Figure 9:
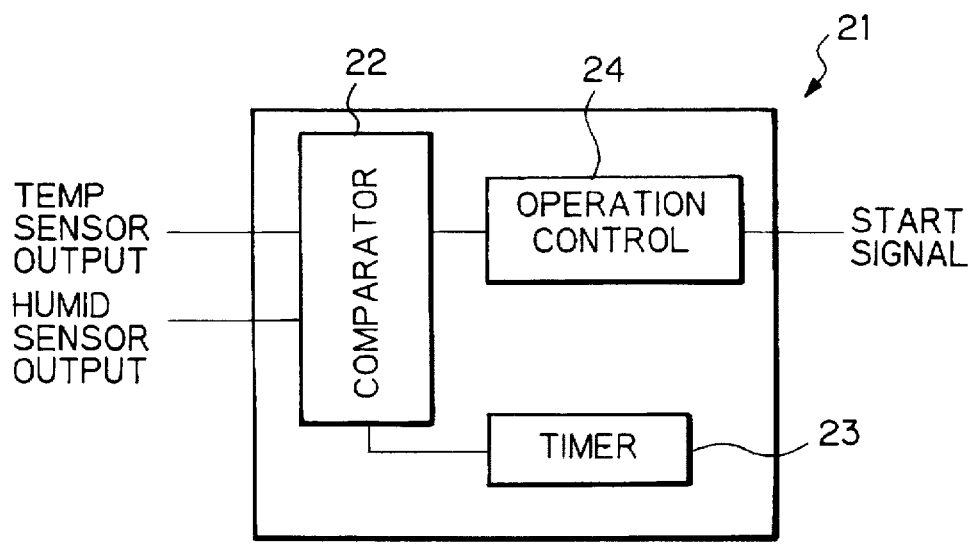
FIG. 9 is a block diagram schematically showing a process control section included in the alternative embodiment.

A reference will be made to FIGS. 8 and 9 for describing an alternative embodiment of the present invention which is implemented as a color printer 19. In this embodiment, the same or similar constituents as or to the constituents of the previous embodiment are designated by the same reference numerals, and a detailed description thereof will not be made in order to avoid redundancy. As shown, a temperature and humidity sensor, or environment measuring means, 20 is positioned between the developing unit 6 and the photosensor 7 in the vicinity of the drum 3. A process control 21 is connected to the sensor 20, density calculation 14, and exposure control 13.

The sensor 20 is made up of a temperature sensor and a humidity sensor (neither of which is shown) respectively responsive to temperature and humidity in the printer 19. As shown in FIG. 9, the process control 21 has a comparator 22 connected to the sensor 20, a timer 23 connected to the comparator 22 for playing the role of environment monitoring means, and an operation control 24 connected to the density calculation 14. In the process control 21, the comparator 22 compares temperature and humidity previously measured by the sensor 20 with the current temperature and humidity. If one or both of the resulting differences in temperature and humidity do not lie in respective predetermined ranges, the operation control 24 delivers a density detection start signal to the density calculation 14. In response, there is executed the density detection procedure beginning with the voltage setting of the potential setting 15 and ending with the density detection of the density calculation 14. The timer 23 feeds a comparison start signal to the comparator 22 every predetermined period of time. Hence, the comparator 22 performs the above comparison periodically.

The printer 19 selectively outputs a color image or detects a toner density in the same manner as the printer 1. The quality of printings electrophotographically produced by the printer 19 is susceptible to temperature and humidity around the printer 19. Specifically, the print quality falls if the temperature and humidity change to a noticeable degree, but it remains substantially constant if otherwise.

In light of the above, in the printer 19, when the toner density is corrected on the basis of the test pattern, the sensor 20 senses the current temperature and humidity in the printer 19. These temperature and humidity are stored in the comparator 22 of the process control 21. When another test pattern is formed later in order to correct toner density, the temperature and humidity of this time are measured by the sensor 20 and fed to the process control 21. In response, the process control 21 compares the current temperature and humidity with the previous temperature and humidity to see if any one of the differences in temperature and humidity does not lie in the respective allowable range. If one or both of the two differences do not lie in the respective allowable ranges, the process control 21 feeds the start signal to the density calculation 14. As a result, the step of forming the test pattern to the step of correcting the toner density are executed. If both of the differences lie in the allowable ranges, the process control 21 inhibits the above sequence of steps.

Specifically, assume that temperature and/or humidity in the printer 19 has changed at the time for starting the procedure beginning with the formation of the test pattern and ending with the correction of toner density due to, e.g., power-up. Then, the printer 19 executes the above procedure, determining that the print quality has fallen. If otherwise, the printer 19 does not execute the procedure. In this manner, the printer 19 executes such a procedure only when it is necessary. This successfully guarantees the time for the usual printing operation to be performed, and reduces the consumption of toner the fatigue of constituent parts.

Further, the printer 19 may be so constructed as to periodically measure, based on a particular operation mode, temperature and humidity in the printer 19, and automatically perform the above toner density detection only when one or both of them have changed. In this case, while the timer 23 feeds the start signal to the comparator 22 at predetermined intervals, the comparator 22 takes in the outputs of the sensor 20. In response, the comparator 22 determines whether or not one or both of the differences between the current temperature and humidity and the previous temperature and humidity lie in the respective allowable ranges. The output of the comparator 22 is used to execute or inhibit the previously stated sequence of steps. In this manner, the printer 19 can also automatically correct the toner density of a color image without resorting to user's troublesome operation, thereby insuring high print quality with a simple procedure.

In summary, it will be seen that the present invention provides a color image forming apparatus having various unprecedented advantages, as enumerated below.

(1) Because the tonality of a test pattern is rendered by the dither method, the density of the test pattern read faithfully corresponds to the actual toner density. Hence, the toner density can be detected with accuracy.

(2) Because the toner density is corrected on the basis of a bias to be applied to a charger and/or a bias to be applied to a developing unit, print quality can be accurately corrected by a simple structure.

(3) The toner density is automatically controlled to an adequate allowable range without resorting to a troublesome operation, so that desirable print quality is achievable.

(4) Only the test pattern can be read at an adequate time. This excludes needless data and thereby enhances the efficient detection of the toner density of the test pattern.

(5) A procedure for the correction of toner density is executed only if temperature and/or humidity in the apparatus has changed from the time of the previous correction. Hence, the correction can be executed at an adequate time.

(6) The correction is automatically executed in response to a change in temperature and/or humidity. This insures high print quality without resorting to a troublesome operation.

Various modifications will become possible for those skilled in the art after receiving the teachings of the present disclosure without departing from the scope thereof.

What is claimed is:

1. A color image forming apparatus comprising:
   a photoconductive element;
   a charger for charging a surface of said photoconductive element;
   an exposing unit for electrostatically forming a latent image on the charged surface of said photoconductive element and producing a pixel exposure signal indicative of pixel exposure;
   a developing unit for developing the latent image with a color toner;
   pattern forming means for causing said exposing unit to electrostatically form on said photoconductive element a latent image representative of a test pattern which has multiple tones set by a dither method;
   pattern reading means for optically reading the test pattern developed by the color toner;
   a density detecting device for detecting toner density of the test pattern in response to an output of said pattern reading means, comprising,
   a counter for counting said pixel exposure signal, said counting being initiated by exposure of a test pattern by said exposing unit, and
   a calculator for retrieving the optically read test pattern at a predetermined reference count matching a count of said counter and determining a toner density of the test pattern;
   a potential setting device, provided with the determined toner density, for setting biases for at least one of said exposing unit and said developing unit based on the determined toner density; and
   a repeating mechanism for repeatedly performing bias setting, pattern forming, pattern reading, and density detection until the detected density of the test pattern is within a predetermined delta of a predetermined reference density.

2. An apparatus as claimed in claim 1, further comprising voltage setting means for setting, based on the toner density of the test pattern, at least one of a voltage to be applied to said developing unit and a voltage to be applied to said charger.

3. An apparatus as claimed in claim 2, further comprising operation control means for repeating voltage setting of said voltage setting means, charging of said charger, pattern formation of said pattern forming means, pattern development of said developing unit, pattern reading of said pattern reading means, and density detection of said density detecting means until the toner density detected by said density detecting means reaches a predetermined allowable range.

4. An apparatus as claimed in claim 2, further comprising:
   environment measuring means for measuring at least one of temperature and humidity in said apparatus; and
   operation control means for executing, when an output of said environment measuring means does not lie in a predetermined allowable range, voltage setting of said voltage setting means, charging of said charger, pattern formation of said pattern forming means, pattern development of said developing unit, pattern reading of said pattern reading means, and density detection of said density detecting means.

5. An apparatus as claimed in claim 4, further comprising environment monitoring means for causing said environment measuring means to repeatedly operate at predetermined intervals.

6. An apparatus as claimed in claim 1, further comprising:
   signal detecting means for detecting operation signals of said pattern forming means; and
   detection control means for controlling a time for said pattern reading means to read the test pattern.

7. A color image forming apparatus comprising:
   a photoconductive element;
   a charger for charging a surface of said photoconductive element;
   an exposing unit for electrostatically forming a latent image on the charged surface of said photoconductive element;
   a developing unit for developing the latent image with a color toner;
   pattern forming means for causing said exposing unit to electrostatically form on said photoconductive element a latent image representative of a test pattern which has multiple tones set by a dither method;
   pattern reading means for optically reading the test pattern developed by the color toner;
   density detecting means for detecting toner density of the test pattern in response to an output of said pattern reading means;
   voltage setting means for setting, based on the toner density of the test pattern, at least one of a voltage to be applied to said developing unit and a voltage to be applied to said charger;

environment measuring means for producing an output indicative of at least one of temperature and humidity in said apparatus; and operation control means for executing, when the output of said environment measuring means does not lie in a predetermined allowable range, voltage setting of said voltage setting means, charging of said charger, pattern formation of said pattern forming means, pattern development of said developing unit, pattern reading of said pattern reading means, and density detection of said density detecting means.

8. An apparatus as claimed in claim 7, further comprising environment monitoring means for causing said environment measuring means to repeatedly operate at predetermined intervals.

9. A color image forming apparatus comprising:

a photoconductive element;

a charger for charging a surface of said photoconductive element;

an exposing unit for electrostatically forming a latent image on the charged surface of said photoconductive element and producing a pixel exposure signal indicative of pixel exposure;

a developing unit for developing the latent image with a color toner;

pattern forming device for causing said exposing unit to electrostatically form on said photoconductive element a latent image representative of a test pattern which has multiple tones set by a dither method;

pattern reading device for optically reading the test pattern developed by the color toner;

a density detecting device for detecting toner density of the test pattern in response to an output of said pattern reading device, comprising, a counter for counting said pixel exposure signals said counting being initiated by exposure of a test pattern by said exposing unit, and a calculator for retrieving the optically read test pattern at a predetermined reference count matching a count of said counter and determining a toner density of the test pattern;

a potential setting device, provided with the determined toner density, for setting biases for at least one of said exposing unit and said developing unit based on the determined toner density; and a repeating mechanism for repeatedly performing bias setting, pattern forming, pattern reading, and density detection until the detected density of the test pattern is within a predetermined delta of a predetermined reference density.

10. The apparatus as claimed in claim 9, further comprising a voltage setting device for setting, based on the toner density of the test pattern, at least one of a voltage to be applied to said developing unit and a voltage to be applied to said charger.

11. The apparatus as claimed in claim 10, further comprising an operation control device for repeating voltage setting of said voltage setting device, charging of said charger, pattern formation of said pattern forming device, pattern development of said developing unit, pattern reading of said pattern reading device, and density detection of said density detecting device until the toner density detected by said density detecting device reaches a predetermined allowable range.

12. The apparatus as claimed in claim 10, further comprising:

an environment measuring device for measuring at least one of temperature and humidity in said apparatus; and an operation control device for executing, when an output of said environment measuring device does not lie in a predetermined allowable range, voltage setting of said voltage setting device, charging of said charger, pattern formation of said pattern forming device, pattern development of said developing unit, pattern reading of said pattern reading device, and density detection of said density detecting device.

13. The apparatus as claimed in claim 12, further comprising an environment monitoring device for causing said environment measuring device to repeatedly operate at predetermined intervals.

14. The apparatus as claimed in claim 9, further comprising:

a signal detecting device for detecting operation signals of said pattern forming device; and a detection control device for controlling a time for said pattern reading device to read the test pattern.

15. A method of forming a color image, comprising the steps of:

charging a surface of a photoconductive element;

exposing the charged surface by an exposing unit to electrostatically form a test pattern which has multiple tones set by a dither method and produce a pixel exposure signal indicative of pixel exposure;

developing said test pattern by a developing unit with color toner;

reading the developed test pattern optically;

counting of said pixel exposure signal by a counter, said counting initiated upon exposure of said test pattern on said photoconductive element;

detecting a toner density of the optically read test pattern at a predetermined reference count matching a count of said counter;

setting biases for at least one of said exposing unit and said developing unit based on the detected toner density; and repeating each step until the detected toner density of the test pattern is within a predetermined delta of a predetermined reference density.

16. The method according to claim 15, wherein said step of setting biases comprises the substep of setting at least one of a voltage applied to said developing unit and a voltage applied to a charger utilized in said charging step.

17. The method according to claim 16, further comprising the step of:

measuring environmental conditions of at least one of temperature and humidity of an environment in which said method of forming a color image is being performed;

wherein said step of setting biases further comprises the step of compensating said biases and said voltages based upon said environmental conditions when said environmental conditions are outside a predetermined range.

18. The method according to claim 17, wherein said step of repeating comprises the substep of repeating each step at predetermined intervals.

19. A color image forming apparatus comprising:

a color image carrier;

a charger for charging a surface of said color image carrier;

an exposing unit for electrostatically forming a latent image on the charged surface of said color image carrier and producing a pixel exposure signal indicative of pixel exposure;

a developing unit for developing the latent image with a color toner;

pattern forming means for causing said exposing unit to electrostatically form on said color image carrier a latent image representative of a test pattern which has multiple tones set by a dither method;

pattern reading means for optically reading the test pattern developed by the color toner;

a density detecting device for detecting toner density of the test pattern in response to an output of said pattern reading means, comprising, a counter for counting said pixel exposure signal, said counting being initiated by exposure of a test pattern by said exposing unit, and a calculator for retrieving the optically read test pattern at a predetermined reference count matching a count of said counter and determining a toner density of the test pattern;

a potential setting device, provided with the determined toner density, for setting biases for at least one of said exposing unit and said developing unit based on the determined toner density; and a repeating mechanism for repeatedly performing bias setting, pattern forming, pattern reading, and density detection until the detected density of the test pattern is within a predetermined delta of a predetermined reference density.

20. The apparatus as claimed in claim 19, further comprising a voltage setting device for setting, based on the toner density of the test pattern, at least one of a voltage to be applied to said developing unit and a voltage to be applied to said charger.

21. The apparatus as claimed in claim 20, further comprising an operation control device for repeating voltage setting of said voltage setting device, charging of said charger, pattern formation of said pattern forming means, pattern development of said developing unit, pattern reading of said pattern reading means, and density detection of said density detecting device until the toner density detected by said density detecting device reaches a predetermined allowable range.

22. The apparatus as claimed in claim 20, further comprising:

an environment measuring device for measuring at least one of temperature and humidity in said apparatus; and an operation control device for executing, when an output of said environment measuring device does not lie in the predetermined allowable range, voltage setting of said voltage setting device, charging of said charger, pattern formation of said pattern forming means, pattern development of said developing unit, pattern reading of said pattern reading means, and density detection of said density detecting device.

23. The apparatus as claimed in claim 22, further comprising an environment monitoring device for causing said environment measuring device to repeatedly operate at predetermined intervals.

24. The apparatus as claimed in claim 19, further comprising:

a signal detecting device for detecting operation signals of said pattern forming means; and a detection control device for controlling a time for said pattern reading means to read the test pattern.

25. A method of forming a color image, comprising the steps of:

charging a surface of a color image carrier;

exposing the charged surface by an exposing unit to electrostatically form a test pattern which has multiple tones set by a dither method and produce a pixel exposure signal indicative of pixel exposure;

developing said test pattern by a developing unit with color toner;

reading the developed test pattern optically;

counting of said pixel exposure signal by a counter, said counting initiated upon exposure of said test pattern on said color image carrier;

detecting a toner density of the optically read test pattern at a predetermined reference count matching a count of said counter;

setting biases for at least one of said exposing unit and said developing unit based on the detected toner density; and repeating each step until the detected toner density of the test pattern is within a predetermined delta of a predetermined reference density.

26. The method according to claim 25, wherein said step of setting biases comprises the substep of setting at least one of a voltage applied to said developing unit and a voltage applied to a charger utilized in said charging step.

27. The method according to claim 26, further comprising the step of measuring environmental conditions of at least one of temperature and humidity of an environment in which said method of forming a color image is being performed;

wherein said step of setting biases further comprises the step of compensating said biases and said voltages based upon said environmental conditions when said environmental conditions are outside a predetermined range.

28. The method according to claim 27, wherein said step of repeating comprises the substep of repeating each step at predetermined intervals.

* * * * *